Patented Aug. 17, 1937

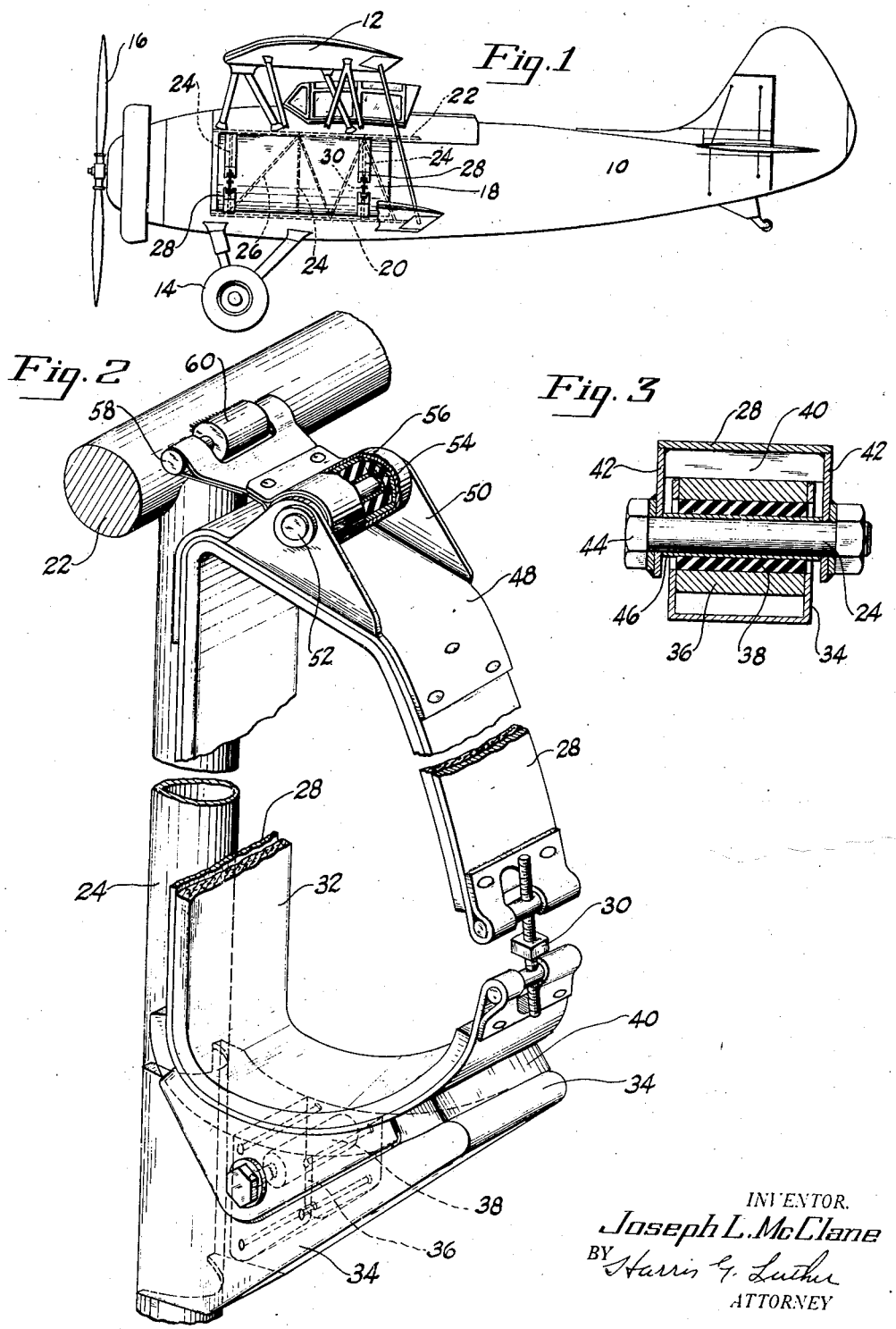

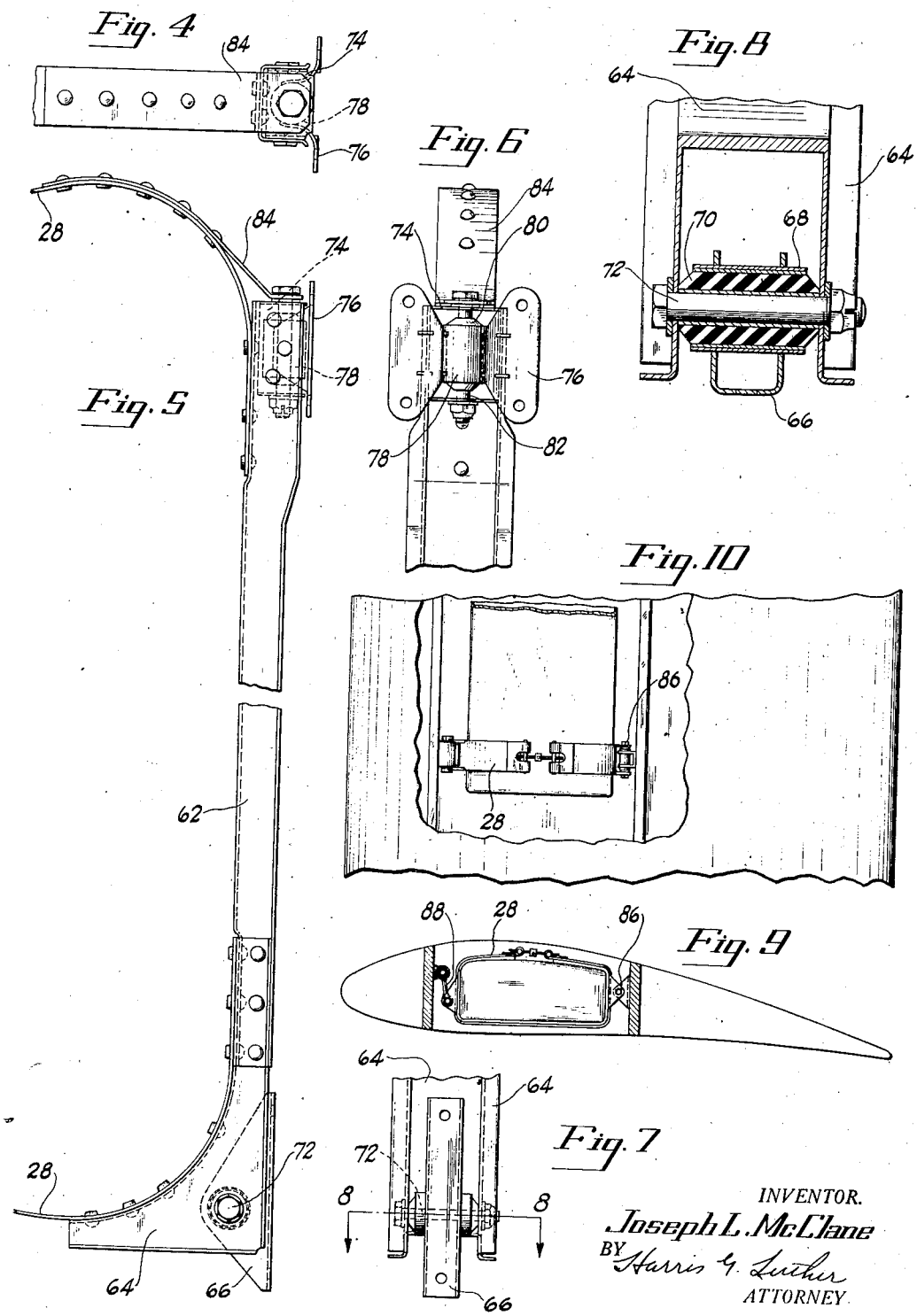

2,090,059

UNITED STATES PATENT OFFICE 2,090,059

FLEXIBLE MOUNTING

Joseph L. McClane, Hartford, Conn., assignor, by mesne assignments, to United Aircraft Corporation, a corporation of Delaware Application July 25, 1934, Serial No. 736,927

15 Claims. (Cl. 248—358)

This invention relates to supports.

More particularly, this invention relates to a flexible mounting for a tank in an aircraft.

The distribution of weight in an airplane is quite important and it is, therefore, advantageous to have any weights that may vary during flight, such as fuel tank contents as near as possible to the center of lift of the airplane. The variation of weight will then have the minimum of effect upon the various adjustments and controls of the plane.

One convenient location for such a tank is on the side of the fuselage of an airplane in substantially vertical alignment, fore and aft of the ship, with the center of the lift forces. Such a position also facilitates inspection or replacement, both of which are important items.

The fuselage of an airplane is, however, not a perfectly rigid structure, but is designed to flex under the air forces encountered during flight. A tank or other object secured to the fuselage frame must, therefore, be designed strong and heavy enough to withstand the strains imparted to it by the flexing fuselage.

Weight, however, is an important factor in airplane design, and it is, therefore, desirable to build a tank only heavy enough to withstand the forces imparted to it by its contents and the vibration forces transmitted to it through the fuselage without incorporating the additional strength and weight required to withstand strains due to flexure.

One of the objects of this invention is to provide an improved mounting.

Another object of this invention is to provide a flexible tank mounting for an airplane.

Other objects and advantages of my invention will be apparent from the accompanying specification and drawings which illustrate what is now considered the preferred embodiment.

Fig. 1 is a side view of an airplane with a tank installed.

Fig. 2 is a perspective view with parts broken away showing the tank supporting straps and their connection with the fuselage frame.

Fig. 3 is a detail of the lower pivotal connection between the strap and its supporting bracket.

Fig. 4 is a partial top view, and

Fig. 5 is a partial side view of a modified form of mount, with a portion of the strap removed.

Fig. 6 is an end elevation of the top joint in the modification of Fig. 5, and

Fig. 7 is an end elevation of the bottom joint thereof.

Fig. 8 is a detail view taken on the line 8—8 of Fig. 7 and showing the rubber bushing mounting.

Figs. 9 and 10 show a top and end elevation of a modification similar to that shown in Figs. 1-3 but mounted between the spars of a wing.

This invention is shown applied to an airplane having a fuselage 10, wings 12, landing gear 14 and propeller 16. A tank 18 is supported at the side of the fuselage 10 and is usually designed so that the outside of the tank forms a substantially unbroken continuation of the fuselage covering to thereby minimize air disturbance. Only one tank is shown in Fig. 1, but it is to be understood that a similar tank is supported on the opposite side of the fuselage in symmetrical arrangement with the tank shown.

These tanks are supported from the airplane fuselage frame which comprises longérons 20 and 22 and members 24 and 26. Straps 28 encircle the tank, and are clamped securely thereon by means of the right and left hand screw 30. A strip of resilient material 32 is placed between the strap and the tank to prevent any chafing that otherwise might occur. These straps are provided with fittings by means of which they and, in turn, the tank is held in position on the fuselage frame. A bracket 34 is welded on one of the frame members 24 and extends outwardly therefrom. A block 36 is secured in position in this bracket by means of rivets and provides a support for a resilient bushing 38, which may be a canvas reinforced rubber bushing. Resilient pad 40 which may be a cork and rubber composition is placed on top of the bracket 34 and serves as a support for the tank encircling strap 28. Ears 42 are welded on the strap 28 and extend downwardly therefrom on either side of the bracket 34. A bolt 44, having a spacing bushing 46 mounted thereon, passes through these ears and through the resilient bushing 38 and serves as a pivotal connection between the strap 28 and the bracket 34.

By means of this type of connection vibration shocks are effectively damped and provision is made for a limited amount of movement between the frame member 24 and the tank 18.

A plate 48 having ears 50 bent up thereon is secured adjacent the upper portion of the strap 28. A bolt 52 is passed through these ears and inside of a rubber bushing 54 mounted in the strap 56. A pin 58 is passed through the other end of the strap and through a boss 60 welded on to longéron 22. This strap 56 and its connections with the longéron and with the strap 28 serve as a pivotal mounting for the upper portion of the tank. This connection, it will be noted, is capable of transmitting practically no vertical forces, and serves only as a means for holding the tank in position. By means of the rubber bushing, the vibration forces are damped, and an additional freedom of movement permitted.

It will thus be seen that I have provided a flexible mounting by means of which the supporting frame may flex within limits and impart but a small amount of the flexure to the tank. The tank, in consequence, will assume but a small portion of the load or forces resisting this flexure.

In Figs. 4–8 there has been illustrated a modified form of tank support designed primarily to support a tank on the fire wall of an airplane. In this construction a strap 28 encircles the tank and is secured thereon by a right and left hand screw in a manner similar to that described above.

The strap between the mountings or supports is formed of a U-shaped member 62 to each end of which the remaining portions of the strap are riveted. Another U-shaped member 64 is riveted to the lower end of the member 62 and is also riveted to the strap 28.

A bracket 66 adapted to be fastened to the fire wall of an airplane (not shown) or to structural members of the airplane is located between the legs of the U-shaped member 64. A tube 68 (see Fig. 8) is welded in position in the bracket 66, and is adapted to support a rubber bushing 70 having an inner and an outer metal sleeve. A bolt 72 passes through the arms of bracket 64 and through the inner sleeve of the rubber bushing to hold the bracket 66 in position relatively to the U-shaped member 64 and the strap 28 and to support the tank.

At the upper end of the member 62 there is another connection between the strap and the supporting fire wall or airplane structure. A strip of metal is bent into the form of a rectangle 74 and placed between the legs of the U-shaped member 62 adjacent the upper portion thereof. Two opposite sides of the rectangular member 74 are riveted to the legs of the U-shaped member 62.

A bracket 76 having a bushing support 78 welded thereon is placed within the rectangular member 74 and a rubber bushing 80 similar to the rubber bushing 70 shown in Fig. 8 is fitted with a press fit into the bushing support 78.

The two remaining opposite sides of the rectangular member 74 are perforated and a bolt 82 is passed through the perforations and through the rubber bushing 80 to hold the strap and bracket in assembled relation. A re-enforcing member 84 is riveted to the strap and brought down under the head of the bolt 82.

When the brackets 66 and 76 are secured to the fire wall or some portion of the airplane structure the tank or other object secured within the strap 28 is insulated from the vibrations of such structure by the rubber bushings 70 and 80 and is furthermore held in such a manner in the flexible mountings that the support may flex an appreciable amount without imparting any appreciable portion thereof to the tank or object held by the straps. It should be noted that while the lower bushing holds the strap against all motion except that permitted by the elasticity of the rubber bushing, and rotation about the bolt 72, the upper bushing permits free vertical movement of the strap in addition to rotation about the bolt 82. This freedom of movement while holding the tank comparatively firmly in position allows the supporting structure to flex in various directions without imparting any material deflection to the supported object.

Figs. 9 and 10 disclose another modification in which a tank is supported between the spars of an air foil such as a wing. In this modification a rubber bushed pivot 86 similar to that shown in Fig. 8 is used as the sole support of one side of the strap as distinguished from the construction shown in Fig. 2 in which the bracket 34 serves as a portion of the support for the strap and the tank. The opposite side of the strap is connected with another spar by a rubber bushed strap 88 similar to the strap 56 shown in Fig. 2. This construction permits flexure of the wing or airfoil under the various loads imposed thereon without imparting any material part of that flexure to the tank supported thereon.

Although but one strap has been shown in each of the figures with the exception of Fig. 1 it is to be understood that two or more straps are usually used on each tank.

Although I have described this support for use especially with tanks such as fuel tanks of an airplane, it is to be understood that my invention is not limited thereto, and that other devices may be supported in a similar manner, and that the drawings are not to be construed as defining or limiting the scope of the invention but as illustrative only.

It is, therefore, to be understood that the invention is not limited to the specific embodiments herein illustrated and described, but may be used in other ways without departure from its spirit, as defined by the following claims.

What I claim is:

1. Means for mounting a tank upon a support subject to flexure so as to reduce the amount of flexure imparted to the tank comprising, in combination, resilient pivotal connections between the support and the tank adjacent the bottom of the tank arranged to transmit vertical loads and additional resilient pivotal connections between the support and the top of the tank, and arranged to transmit substantially no vertical loads.

2. Means for flexibly holding a tank upon a support located at one side thereof, comprising, in combination, a bracket mounted on said support and extending outwardly therefrom adjacent the bottom of the tank, a pivotal connection having a resilient bushing connecting the bracket with the tank and another pivotal connection having a resilient bushing disposed at right angles to the first mentioned bushing connecting the tank and the support adjacent the top of said tank.

3. A device of the character described in claim 2 in which the bracket extends under the tank and includes in addition to the flexible bushing a resilient pad located between the bracket and the tank.

4. A flexible tank support for aircraft, comprising, in combination, a plurality of brackets adapted to support the weight of the tank secured to the aircraft framework, and extending under said tank, a resilient pad between the tank and the bracket and a resilient pivotal connection connecting the tank and the bracket, another pivotal connection between the tank and the framework adjacent the top of the tank and supporting said tank in a normally horizontal direction only.

5. Means for supporting a tank from the framework of an aircraft, comprising, in combination, spaced straps encircling said tank, brackets adapted to support substantially the entire weight of the tank, secured to said framework and pivotally connected one to each of said straps adjacent the bottom portion thereof, and a vertically yieldable connection adjacent the top of each of said straps pivotally connecting respective strap with said framework.

6. A device of the character set forth in claim 5 in which the pivotal connections between the brackets and the straps have normally horizontal axes, and the other pivotal connections are adapted to transmit substantially no vertical forces.

7. A device of the character set forth in claim 5 in which the brackets extend outward from one side of the framework of the aircraft, and extend under the tank, and having a resilient pad located between each bracket and the tank to assist in supporting the weight of the tank, but at the same time permitting limited movement of the tank about the pivotal connection between each strap and the respective bracket.

8. Means for supporting a tank from one side thereof upon an airplane framework, comprising, in combination, straps encircling said tank, means for tightening said straps onto said tank, fittings secured to said framework located adjacent the lower portion of said tank, resilient pivotal connections between said straps and said fittings, other fittings located adjacent the top of said tank, resilient pivotal connections between said fittings and said straps, said latter connections adapted to transmit substantially no vertical forces.

9. In an airplane having a fuselage, in combination, frame members in said fuselage, a tank located at one side of said frame members, and means connecting said tank with said frame members, comprising straps encircling said tank and clamped thereto, a pivotal connection adjacent the top of the tank connecting the strap with the frame members, a resilient bushing between said connection and said strap, a bracket secured to said frame members and extending outwardly therefrom, located under and supporting said strap and tank, a pad of resilient material located between said strap and said bracket and a resilient pivotal connection between said strap and said bracket.

10. A flexible tank support for aircraft, comprising, in combination, a plurality of brackets secured to one member of the aircraft framework and adapted to support at least a portion of the weight of the tank and contents, pivotal connections having resilient bushings therein between the tank and said brackets, and pivotal link connections having resilient bushings therein between the tank and another member of the framework located on the opposite side of the tank from said first-mentioned pivotal connections, whereby said framework members may move relative to each other without distorting said tank.

11. Means for supporting a tank from the framework of an aircraft, comprising, in combination, straps encircling said tank, resilient pivotal connections connecting said straps with one member of said framework and resilient universal connections located at the opposite side of said tank connecting said straps with another member of said framework, to provide freedom of movement in at least one direction between said strap and said other portion of said framework, whereby said portions of said framework may move relative to each other without distorting said tank.

12. Means for supporting a tank or the like in an airplane comprising a strap encircling and contracted onto said tank, a pivotal connection having a resilient bushing therein, connecting the strap with the airplane framework, another pivotal connection having a resilient bushing therein and connecting another portion of the strap with the airplane framework, said another connection restraining said strap and tank against rotation about the first mentioned pivotal connection while providing a limited freedom of movement of the adjacent portions of said strap and tank in a direction transverse to the axis of said first mentioned pivotal connection.

13. Means for supporting a tank or the like in an aircraft, comprising straps secured on said tank, a bracket extending outward from a portion of one of said straps, a pivotal connection having a resilient bushing therein, connecting said strap bracket with the aircraft framework, a bracket extending outward from a portion of said strap on the opposite side of said tank, a pivotal connection having a resilient bushing therein connecting said last mentioned bracket with one end of a link and another pivotal connection between said link and said airplane framework.

14. Means for supporting a tank or the like in an aircraft, comprising straps secured on said tank, one of said straps having a re-enforced U-shaped portion, a resilient pivotal connection having a normally substantially horizontal axis adjacent one end of said re-enforced portion adapted to normally support the weight of the tank and contents, another resilient pivotal connection adjacent the other end of said re-enforced portion having a normally substantially vertical axis at substantially right angles to the axis of said first-mentioned pivotal connection.

15. Means for mounting a tank upon a support subject to flexure so as to reduce the amount of flexure imparted to the tank, comprising, in combination, resilient pivotal connections between the support and the tank adjacent the bottom of the tank, additional resilient pivotal connections adjacent the top of said tank, a link connected at one end to each of said additional pivotal connections and a pivotal connection between each of said links and said support.

JOSEPH L. McCLANE.